Feb. 9, 1932.   K. F. W. KEMPF   1,843,925
KEY BOLT
Filed Nov. 18, 1927
Fig. 1.
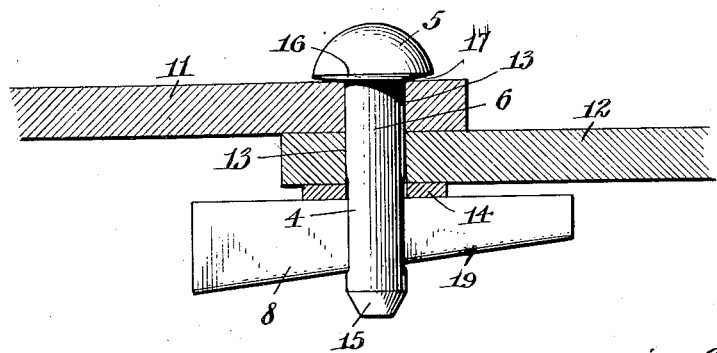
Fig. 2.   Fig. 4.   Fig. 3.
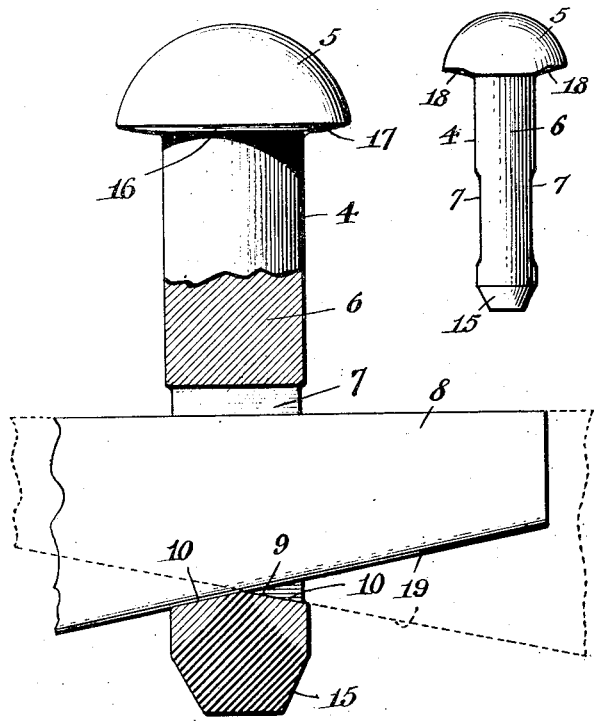   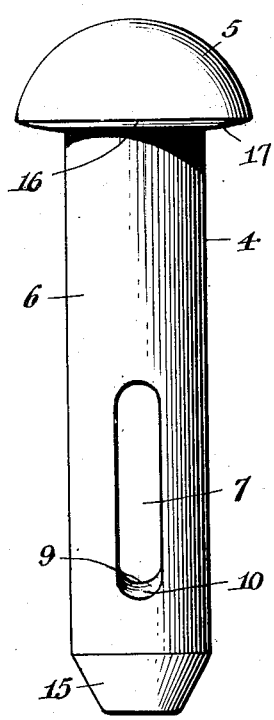
Karl F. W. Kempf, Inventor.
By Emil ........., Attorney.

Patented Feb. 9, 1932

1,843,925

UNITED STATES PATENT OFFICE

KARL F. W. KEMPF, OF BUFFALO, NEW YORK

KEY-BOLT

Application filed November 18, 1927. Serial No. 234,133.

My invention relates to improvements in key bolts, and more particularly to that type constructed of cylindrical stock and used for fitting-up purposes, or for temporarily connecting parts or objects together, preparatory to riveting or otherwise permanently fastening such parts or objects for use.

Key bolts constructed of cylindrical stock are formed with a one-way slot, into which a wedge key is to be inserted, and therefore the outer end wall of this slot is inclined from one point of the bolt to a point diametrically opposite so that the key slot is shorter at one side of the bolt than the other.

Key bolts are oftentimes used in dark places or close quarters, and through carelessness or ignorance, and sometimes through necessity, the wedge keys used in connection with bolts of this kind are driven into the slot from the shorter side thereof, and while the wedge key may be driven into or through the bolt, either the wedge key or the bolt, and at times both, will become damaged so that they cannot again be used; the bolt will also become bent so that it will be difficult to remove it from the parts or objects which it connects. Other disadvantages result from such use; such, for instance, as inability to properly tighten the bolt. Even though the key is properly inserted in the key slots of bolts as now constructed, untimely destruction of the key bolt takes place due to the stretching of the metal of the bolt in one direction only.

Attempts have been made to assure the proper driving of wedge keys into bolts so formed, by notching the bolt adjacent the slot at its long side so that even when using key bolts in the dark or in close quarters, the long side of the slot can be easily distinguished from the short side, but such precautions do not guard against carelessness of the workmen who invariably disregard provisions thus made.

It is the primary object of my invention to provide a key bolt in which the outer end wall of the key slot has opposite bevels from a point centrally between its ends to the periphery of the bolt at diametrically opposite points, so that the wedge key may be driven into the slot having its beveled edge at the same angle as the bevels of said end wall, from either side of the bolt and assurance had that a proper setting-up of the objects to be connected will take place; also that the edge of the key will not become damaged, nor the bolt unduly bent when the key is driven in place; thus making it possible to use both the bolt and the wedge key for a long period of time. Owing to the fact that after a bolt is used a number of times and it has had its key driven into it successively from one side thereof, whether of the standard or common form or constructed under and according to my invention, it will become bent under the strain to which it is subjected in driving the wedge key in place, but it is a simple matter under my invention, when a bolt is found to be bent, to enter the key from the opposite side of the bolt, which will result, upon driving the key in place, in bending the bolt back into its normal condition.

A further object of my invention is the provision of a key bolt having part of or the entire inner side or connecting surface of its head rounded or beveled to provide clearance space underneath the head at or around the base of the shank, the principle of which is fully described in my co-pending application, filed under Serial No. 108,047 October 15, 1929, and now issued as Patent No. 1,731,423. The advantages of this is that it prevents strain being set up in the bolt in the driven direction, which is largely instrumental in causing keys to become loosened when pneumatic riveting guns or hammers are used in the vicinity of the secured key bolts.

A further object of my invention is the provision of a key bolt having the entrance end thereof tapered to facilitate entering it in the holes of overlying objects without the use of any other tool, such as drift pins commonly used for this purpose. Furthermore, by tapering or otherwise reducing the entrance end of the bolt, it may be driven out of the holes through which it is passed without fear that the metal will be upset to the extent that it will interfere with its removal from the holes.

A still further object of my invention is to provide a key bolt of this kind in which the metal is condensed in the region of the entrance end. It is commonly acknowledged that when perforating a piece of metal, whether done while the metal is hot or cold, a certain displacement of metal takes place; in other words, the stresses set up in a bolt, for instance, when punching a key slot therethrough, causes elongation in many cases beyond the elastic limit, and consequently a bolt so slotted is weakened much more than when a slot of this kind has been formed by methods, such as milling, drilling, shaping, or by any other method under which no stresses are set up in the metal during the operation of forming a slot. A key slot, however, has to be manufacture commercially and as cheaply as possible, and therefore necessitates the use of the cheaper method of punching the slot, rather than milling, drilling, shaping, or otherwise forming the same under conditions where no stresses are set up during the operation of slotting.

In a key bolt constructed in accordance with this invention and as particularly set out in my Patents Nos. 1,651,395 and 1,731,423, the double angle at the outer end wall of the key slot and also the taper at the entrance end of the bolt, not only assures restoration of the metal in this region to its original strength, but it increases the strength of the metal, which results in a key bolt having its metal condensed at the entrance end, as indicated in the drawings, with the result that during the forging process required in making my improved key bolt, if worked at proper heat, the grains or molecules of the metal are consolidated or compressed and the structure of the metal refined.

Since the several features of this invention are fully described in my aforesaid pending applications, this application is a continuation in part of each of said Patents Nos. 1,651,395 and 1,731,423.

With the above and other advantages to appear hereinafter, my invention consists in the novel features of construction embodied in my improved key bolt, as will be hereinafter described and more particularly pointed out in the subjoined claims.

In the drawings:—

Fig. 1 is a view of a key bolt showing the manner in which it is employed to connect two plates or structural elements together.

Fig. 2 is a sectional elevation of the key bolt, showing the construction of the same.

Fig. 3 is an elevation of the key bolt viewed at right angles to Fig. 2.

Fig. 4 is an elevation of a key bolt of slightly modified form.

Reference being had to the drawings in detail, the numeral 4 designates the key bolt considered as a whole, which is forged to shape and desired construction from round bars or stock, 5 the head thereof, and 6 the shank; the latter having a key slot 7 extending diametrically therethrough, and 8 designates a wedge-key, usually employed in key bolts of this kind.

The outer end wall of the key slot is designated by the numeral 9, and it is beveled outwardly in opposite directions, as at 10, from a plane centrally between the ends thereof. The key slot is therefore somewhat shorter at the center of the bolt than at opposite sides of the same.

In Fig. 1 of the drawings, 11 and 12 designate two plates which are provided with rivet or bolt holes 13 through which the key bolt is passed, the head of the bolt lying in contact with the outer surface of the plate 11. This bolt extends a distance through the plate 12 so that the major portion of the key slot is exposed and the wedge key 8 is in firm contact with a washer 14 lying against the outer surface of the plate 12 and with the double beveled end wall 9 of the key slot. The entrance end of the key bolt is tapered, as at 15, and this taper is preferably formed in accordance with the method described in my Patent No. 1,651,395, hereinbefore referred to.

In the formation of the tapered end 15, which may also be termed the entrance end, the metal is condensed at this end and also moved lengthwise so as to occupy, in condensed form, the region indicated by the heavy section lines in Fig. 2, or approximately so, and this results in the opposite bevels being formed at the outer end of the key slot 7. Such construction and the resultant advantage are attained by crowding and working the grains or molecules of metal at the outer end of the bolt within a confined region, thus causing a consolidation or compression of the metal and refining the structure of the steel from which the bolt is made at points where subjected to greatest wear, mainly at the outer end wall of the key slot, at least at its crest, and at the conical end of the bolt.

By reason of providing the outer end of the key slot 7 with opposite bevels, the wedge key 8 may be driven into the key slot from either side. The tapering of the entrance end of the key makes it unnecessary to use drift pins or other similar tools for alining the bolt or rivet holes in the parts to be connected, since the tapered end will serve the purpose of such pin or tool and aline them during the act of driving the key bolt through the opening, although the latter may not be in complete registration.

The key bolt is adapted to be inserted through registering rivet or bolt holes with the outer end thereof projecting from the parts through which it is passed so as to expose a portion of the transverse key slot in said bolt for the reception of the key. By reason of the end of the bolt being tapered, it can be driven freely through the holes, even though they are slightly out of registration, and during the act of driving the bolt through such holes the parts in which the bolt holes are formed will be shifted to bring the holes into true registration. When this condition is found and an attempt is made to force the bolt through the holes, the hardened tapered end of the bolt provides a particular advantage in that the elements in which the bolt holes are formed will be shifted to bring them into exact registration without the sharp edge of the under bolt hole upsetting the bolt, and thus make it more difficult to force the bolt through the holes. This is particularly true, because of the fact that the hardening of the bolt at its tapered end provides an area which invariably is harder than the material through which it is to be forced, and instead of creating a notch in the tapered end of the bolt into which the sharp corner of the wall surrounding the bolt hole would become seated, the hardened tapered end merely rides down against the wall of the lower bolt hole and, if resistance is too great, will force the wall of the bolt hole out of true circular formation without doing damage to the tapered end of the bolt.

In structural work, long tapered centering tools—usually long tapered handles on wrenches—are invariably employed for the purpose of bringing the rivet or bolt holes of two parts or objects into registration, after which key bolts of ordinary form, or common bolts, are driven through the registering bolt holes. However, after bringing the bolt holes into registration, and withdrawing the centering tool therefrom, it is often found that a re-shifting of the parts or objects takes place, so that the rivet or bolt holes again become disalined or moved out of perfect registration, before it is possible to drive key bolts or common bolts through said holes. The alining and maintaining of rivet or bolt holes under such conditions is a difficult operation, especially on structural work having only one pair of bolt holes through which a key bolt, or other bolt, is to be passed.

Furthermore, considerable force is sometimes required when driving the key bolt out of the holes through which it is passed, and oftentimes hammers of considerable weight are used for this purpose, the hammers being driven against the entrance end of the bolt, with the result that, on a bolt of the ordinary type, the entrance end becomes upset beyond the diameter of the bolt and it therefore becomes extremely difficult to force the bolt out of the openings, due to the peripherally projecting portions at the upset end coming in contact with the plates or other objects through which the bolt is passed. It is consequently necessary to either remove these projecting portions of metal or apply a drive pin of smaller diameter than the bolt against the entrance end of the bolt in the hopes that the projecting portions of metal may be sheared off.

By providing a double bevel or angle on the outer end wall of a key slot formed by punching or displacing metal from which the bolt is to be formed, this wall may be constructed in a more smooth or finished manner than is possible with a single bevel, and therefore in driving the wedge keys in place, the formation of burrs is prevented on the key.

The head of the bolt, in preferred form, has its inner or contact surface, indicated by the numeral 16, beveled from the outer periphery of the head toward the shank at its extreme inner end, as indicated at 17. This particular formation of the head prevents the strain set up in the driven direction causing the keys to loosen when pneumatic riveting guns or hammers are used in the vicinity of the key bolts, due to the fact that a sufficient amount of clearance is provided under the head to prevent this and contact of the head occurs only at the angle of the head with the shank of the bolt, as clearly indicated in Fig. 1. If desired, the inner or contact surface 16 may be beveled at diametrically opposite regions, as indicated at 18, Fig. 4, instead of providing a continuous bevel around the bolt; but such separated beveled regions are necessarily alined with the key slot in the bolt; or in other words, in line with the driven direction of the wedge key used in conjunction with the bolt.

When a key bolt constructed in accordance with my invention is inserted through registering rivet or bolt holes and the convex shoulder formed by the head is brought into firm bearing with the outer surface of the outer part or object of structural work, the wedge key 8 is driven into the diametral slot of said key bolt, the tapered edge of said key coming in contact with the outer end wall of said slot. By reason of said outer end wall being oppositely beveled or made to recede from its center outwardly in opposite directions, the key may be driven into the diametral slot from either side. Furthermore, by providing the outer end wall of said diametral key slot with opposite bevels, the tapered edge of the wedge key will engage the high central point or crest of said wall and slide freely along said wall while drawing the bolt tight in a straight line, due to the fact that the hardened outer end of the bolt extends upwardly into and includes at least a portion of the oppositely-tapered end wall of the diametral slot, and at any rate, the high central portion or crest of said wall. The metal from said central high point or crest, owing to its being very refined and condensed, cannot easily be forced to one side of the center or, in other words, over onto the opposite inclined portion of said wall when driving the key slot in position. There is furthermore no tendency of the projecting end of the bolt to flex in the direction in which the key is driven, and consequently the bolt will be retained in a perfectly straight condition, regardless of the amount of force applied to the wedge key, over a long period of time under many times of use.

A key constructed in accordance with my invention can also more readily be used where the outer part or object of structural work does not have a flat surface, since the convex shoulder formed on the under side of the head will find firm bearing against an irregular surface. Should the key bolt be used for a long period of time, and become somewhat slightly flexed, or in the event that the bolt is driven through openings slightly larger in diameter than the diameter of the bolt, it may be found, under such conditions, that the bolt will be drawn at a slight inclination, with the result that the head will find firm lodgment, owing to the convexity of its shoulder. These conditions are common in construction work of various kinds, and a bolt formed with its head convexed on its under side has therefore decided advantages over a bolt having a flat shoulder, or flat under side for the head.

It is particularly to be noted that the wedge edge 19 of the wedge key is cut or formed at the same angle as the bevels on the outer end wall 9 of the key slot; thus assuring a solid grip for the key, preventing the formation of burrs when driving the key in place, and minimizing the tendency to bend the bolt under the driving strain applied.

Having thus described my invention, what I claim is:—

1. A key bolt having a head and a shank, the shank being provided with a key slot and having the metal at the entrance end of the shank condensed.

2. A key bolt having a head and a shank, the shank being provided with a key slot and having metal condensed in the region between the entering extremity of said shank and said key slot.

3. A key bolt having a shank and a head, the shank being provided with a key slot and having its entrance end tapered, the metal at said tapered end being condensed and the metal in the region between said tapered end and said key slot being also condensed at least throughout its central portion.

4. A key bolt having a shank and a head, said shank having a key slot extending diametrically therethrough and provided with an outer end wall beveled from a point midway between its length to its outer ends, said shank having also a beveled entrance end and having the metal condensed at said entrance end and also in the region between said beveled portion and the oppositely beveled outer end wall of said key slot.

5. A key bolt having a shank and a head, the shank being provided with a key slot and having its entrance end tapered, the metal at said tapered end being condensed.

6. A key bolt having a shank and a head, the shank being provided with a key slot and having its entrance end tapered, the metal between said tapered end and said key slot being condensed at least throughout its central portion.

In testimony whereof I affix my signature.

KARL F. W. KEMPF.